(12) United States Patent
Rodriguez et al.

(10) Patent No.: US 11,386,871 B2
(45) Date of Patent: Jul. 12, 2022

(54) INSTRUMENTATION PERSPECTIVE AND LIGHT EMULATOR

(71) Applicant: Continental Automotive Systems, Inc., Auburn Hills, MI (US)

(72) Inventors: Irving Morales Rodriguez, Jalisco (MX); Hermes Ivan Rodriguez-Apodaca, Jalisco (MX); Alvaro Ivan Ontiveros, Jalisco (MX); Kevin Arrunategui Mojica, Jalisco (MX); Tobias Regner, Baden-Württemberg (DE)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 16/718,878

(22) Filed: Dec. 18, 2019

(65) Prior Publication Data

US 2021/0193082 A1 Jun. 24, 2021

(51) Int. Cl.
| | |
|---|---|
| *G09G 5/37* | (2006.01) |
| *B60K 35/00* | (2006.01) |
| *G06F 3/01* | (2006.01) |
| *G09G 5/10* | (2006.01) |
| *G09G 5/38* | (2006.01) |

(52) U.S. Cl.
CPC ............... *G09G 5/37* (2013.01); *B60K 35/00* (2013.01); *G06F 3/013* (2013.01); *G09G 5/10* (2013.01); *G09G 5/38* (2013.01); *B60K 2370/149* (2019.05); *B60K 2370/167* (2019.05); *B60K 2370/52* (2019.05); *B60K 2370/736* (2019.05); *G09G 2354/00* (2013.01)

(58) Field of Classification Search
CPC ................................................. B60K 2370/167
See application file for complete search history.

(56) References Cited

U.S. PATENT DOCUMENTS

| | | | |
|---|---|---|---|
| 2015/0331487 A1* | 11/2015 | Roth | ........................ G06F 3/013 345/156 |
| 2017/0136877 A1 | 5/2017 | Boss et al. | |
| 2017/0249718 A1 | 8/2017 | Wall | |
| 2018/0059905 A1* | 3/2018 | Ho | ........................ G06F 3/0483 |
| 2019/0073040 A1 | 3/2019 | Luchner et al. | |

FOREIGN PATENT DOCUMENTS

EP 3212453 A1 9/2017

OTHER PUBLICATIONS

International Search Report and the Written Opinion of the International Searching Authority dated Mar. 10, 2021 for the counterpart PCT Application No. PCT/2020/065377.

* cited by examiner

*Primary Examiner* — Gustavo Polo (57) ABSTRACT

A vehicle instrument panel assembly includes a display that generates an image indicative of a vehicle operating parameter, a first sensor disposed proximate the display that senses a position of an operator relative to the display and a controller that modifies the image responsive to the sensed position of the operator.

8 Claims, 7 Drawing Sheets

INSTRUMENTATION PERSPECTIVE AND LIGHT EMULATOR

TECHNICAL FIELD

The present disclosure relates to vehicle instrument panels and clusters, and more specifically to a vehicle instrument panel that includes adaptive features that change to provide perspective and light effects.

BACKGROUND

Vehicles include instrument panels to communicate information indicative of operation to an operator. Motor vehicles include instrument panels with several gauges and dials that communicate vehicle conditions such as speed, engine rpm, temperature, oil pressure along with many other operational parameters. Conventional instrument panels include gauges that are fixed and substantially two-dimensional.

Flat screen displays provide much more information than standard gauges within the same space. For example, a single display can be utilized to display vehicle speed in one moment, and then changed to display a map, engine rpm or other desired parameter indicative of vehicle operation. The flat screen displays allow a vehicle designer to provide more information within a fixed area of the instrument panel.

Although a flat screen display provides many different possible display combinations, it limits the aesthetic appearance of the instrument panel because although the display itself may provide different images, the physical appearance can be uninteresting and limit design alternatives. Moreover, three-dimensional effects can be displayed on the display but are limited to the graphics generated by images on the display.

Accordingly, it is desirable to design and develop an instrument panel that includes a flat panel display with features that add both increased functionality while providing desired three-dimensional appearance and effects.

SUMMARY

A vehicle instrument panel assembly according to an exemplary embodiment of this disclosure, among other possible things includes a display that generates an image indicative of a vehicle operating parameter, a first sensor disposed proximate the display that senses a position of an operator relative to the display and a controller that modifies the image responsive to the sensed position of the operator.

In another example embodiment of the foregoing vehicle instrument panel assembly, a second sensor is disposed proximate the display that sense a position of an operators eyes relative to the display.

In another example embodiment of any of the foregoing vehicle instrument panel assemblies, the controller modifies a perspective of the image based on the sensed position of the operator relative to the display.

In another example embodiment of any of the foregoing vehicle instrument panel assemblies, the controller modifies the perspective view of the image based on the sensed position of the operator's eyes relative to the display.

In another example embodiment of any of the foregoing vehicle instrument panel assemblies, the modified image comprise a perspective view emulating moving between 1° and 45° degrees left, right or above the display.

In another example embodiment of any of the foregoing vehicle instrument panel assemblies, the image comprises at least one representation of a gauge with a pointer that indicates a value of a current operating parameter, wherein the gauge comprises an outer housing and a gauge face on which the pointer indicates and the perspective view emulates a view of the gauge as would be viewed if present in the instrument panel assembly in-place of the display.

In another example embodiment of any of the foregoing vehicle instrument panel assemblies, the image further includes a graphical representation of an object disposed on the display and the perspective view emulates a view of the object as would be viewed if present in the instrument panel assembly in-place of the display.

In another example embodiment of any of the foregoing vehicle instrument panel assemblies, a light sensor that detects a light level surrounding the display and wherein the controller modifies the image responsive to the light level surrounding the display.

In another example embodiment of any of the foregoing vehicle instrument panel assemblies, modification of the image comprises generation of a shadow based on a direction of light sensed by the light sensor.

In another example embodiment of any of the foregoing vehicle instrument panel assemblies, the image comprises a first gauge including a first housing and a first gauge face, a second gauge inkling a second housing and a second gauge face.

In another example embodiment of any of the foregoing vehicle instrument panel assemblies, the image further includes an object disposed between the first gauge and the second gauge, wherein the object includes at least one of a symbol, graph, chart and/or a text box indicative of a current status of a vehicle system.

A method of communicating information to an operator of a motor vehicle according to another exemplary embodiment includes, among other possible things, generating an image representing a gauge on a display screen disposed within a vehicle instrument panel assembly, sensing a position of an operator relative to the image generated on the display with a first sensor disposed proximate the vehicle instrument panel assembly and modifying the image automatically with a controller based on the sensed position of the operator relative to the image generated on the display.

Another example embodiment of the foregoing method further includes sensing a position of an operators eyes relative to the image generated on the display with a second sensor disposed proximate the display.

In another example embodiment of any of the foregoing methods, modifying the image is performed to be a perspective view of the gauge as would be viewed by the operator based on the sensed position of the operator relative to the display.

In another example embodiment of any of the foregoing methods, modifying the perspective view of the image is based on the sensed position of the operator's eyes relative to the display.

In another example embodiment of any of the foregoing methods, the modified image comprises a perspective view emulating moving between 1° and 45° left, right or above the display.

Another example embodiment of any of the foregoing methods includes generating a graphical representation of an object on the display and the perspective view emulates a view of the object as would be viewed if present in the instrument panel assembly in-place of the display.

Another example embodiment of any of the foregoing methods includes detecting a light level and direction of light surrounding the display with a light sensor and modifying the image to include shadows responsive to the sensed light level and direction of light.

In another example embodiment of any of the foregoing methods, the image of a gauge comprises a first gauge including a first housing and a first gauge face, a second gauge inkling a second housing and a second gauge face.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
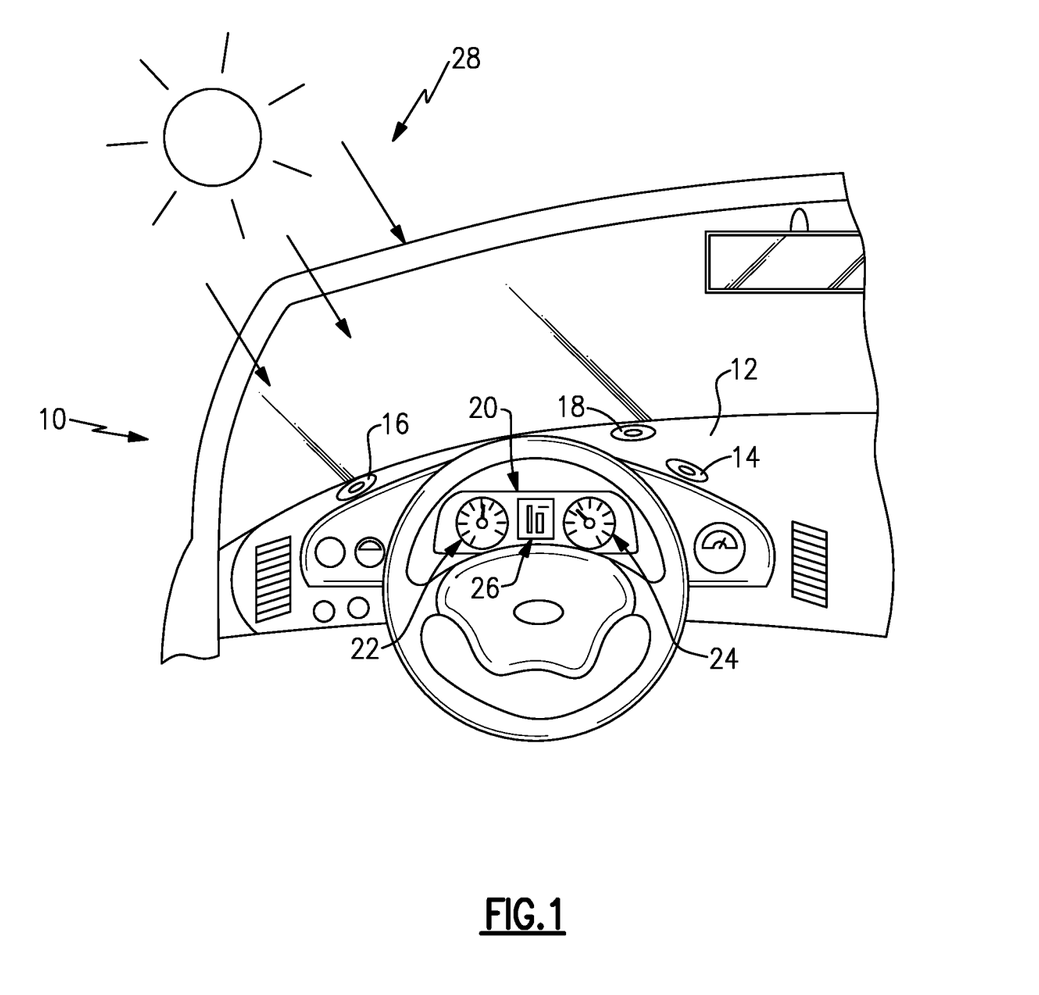
FIG. 1 is a schematic view of an example vehicle instrument panel assembly embodiment.

Referring to FIG. 1, a vehicle 10 includes an instrument panel assembly 12 with a display 20 that produces images that depict a first gauge 22, a second gauge 24 and an object 26. A first sensor 14 detects a position of an operators head. A second sensor 16 detects a position of an operator eyes to determine a direction from which the operator is viewing the images on the display 20. The light sensor 18 provides information indicative of an intensity and direction of light relative to the display 20. The images of the first gauge 22 and the second gauge 24 are modified during vehicle operation based in information provided by the sensors 14, 16 and 18. The modifications to the images of the gauges 22, 24 and the object 26 provide an appearance of perspective and shading as would occur for actual physical gauges. The first sensor 14, second sensor 16 may be a camera or several cameras oriented on the instrument panel assembly 12 and around the display. Each of the first sensor 14 and the second sensor 16 may also be multiple sensors places around the display 20 and the instrument panel assembly 12. Moreover, the light sensor 18 may include several different light sensors disposed in different locations relative to the display to provide information indicative of light in varied locations around the display 20.

Figure 2:
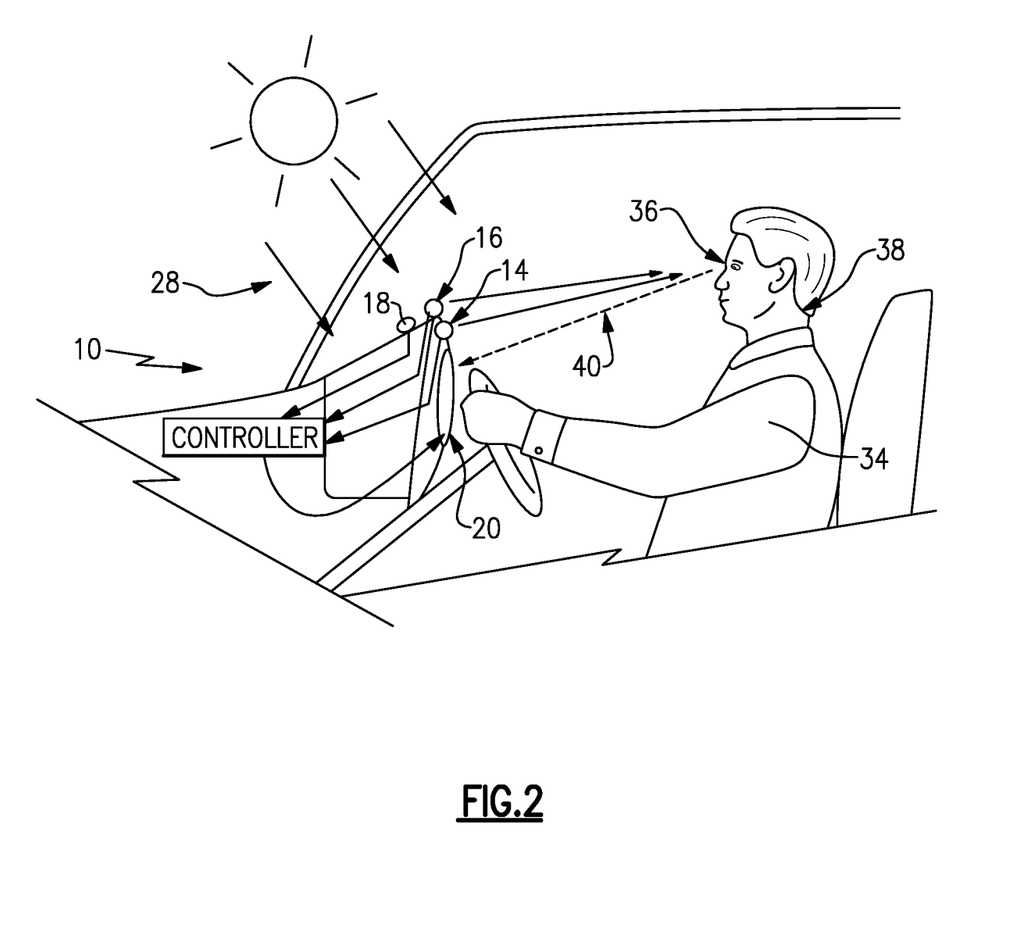
FIG. 2 is a schematic view of an operator seated within a vehicle relative to the example vehicle instrument panel embodiment.

Referring to FIG. 2 with continued reference to FIG. 1, a vehicle operator 34 is schematically depicted seated relative to the instrument panel assembly 12 and display 20. The first sensor 14 detects a position of the head 38 of the operator 34. The second sensor 16 detects a position of the operator's eyes 36. The position of the operator's eyes 36 is used to determine a direction 40 from which the operator 34 is viewing the display. The direction 40 is schematically shown as a downward angle. However, side angles would also include and sensed by the sensors 14, 16 and communicated to a controller 32. The sensors 14, 16 may be any known sensor that generates information indicative of an operator's position relative to the display. The sensors 14, 16 may be cameras that detect features and a direction of view of the operator. The controller 32 could be integrated into the display 20, the instrument panel assembly or be software provided on a vehicle controller.

Additionally, the light sensor 18 senses the intensity of light 28 around the display 20. The light sensor 18 is also utilized to detect a direction of light relative to the display 20. The information indicative of intensity and direction are communicated to the controller 32. The light sensor 18 may be of any known configuration and is placed proximate the display in a manner that provides information of light as it is perceived on the display 20.

Figure 3:
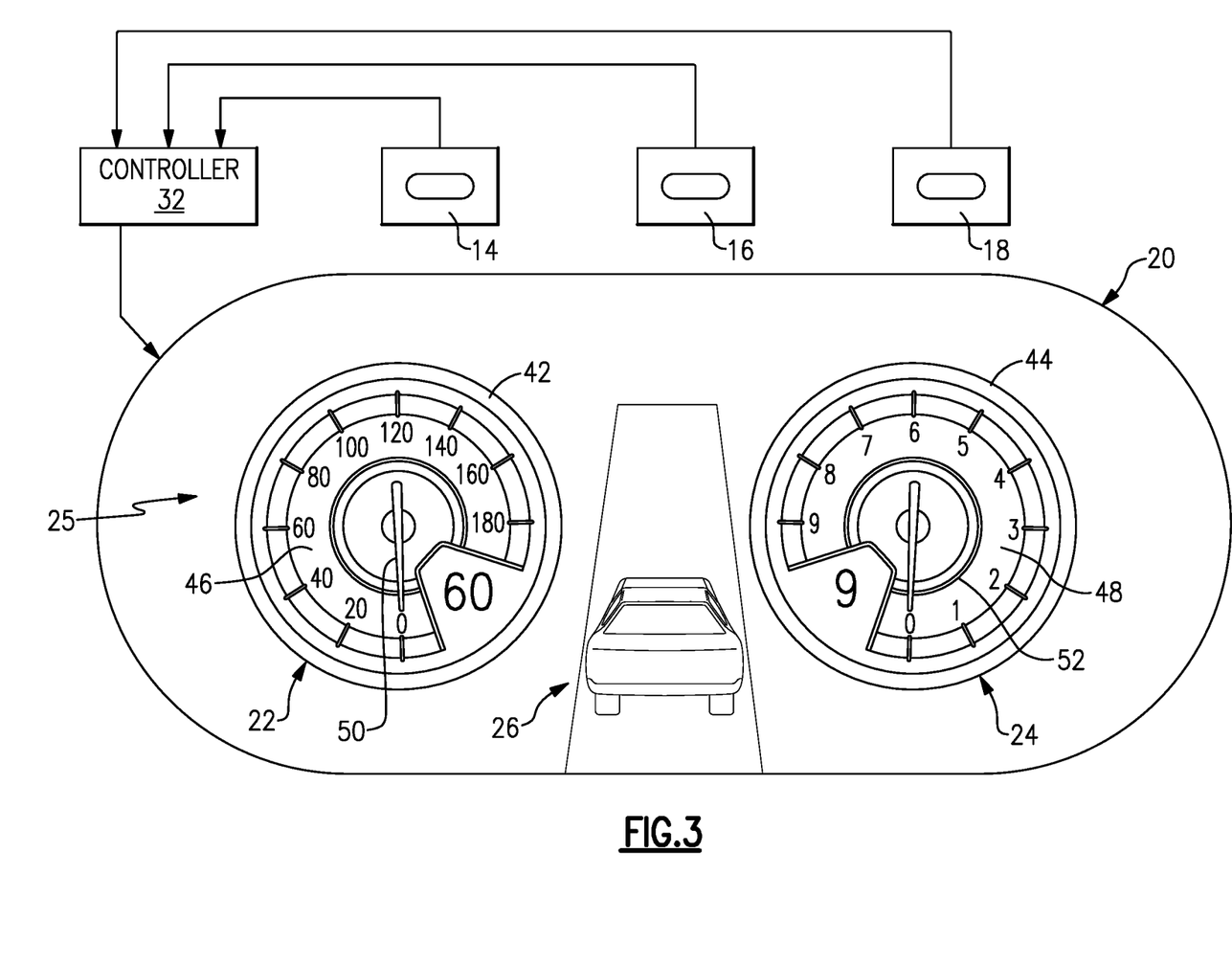
FIG. 3 is schematic view of an example non-modified image generated by the display without perspective and shading.

Referring to FIG. 3, with continued reference to FIGS. 1 and 2, the display 20 is shown schematically in a default, un-modified condition. This initial position is not adjusted based on input from the sensors 14, 16 and 18. In this example, the image of the first gauge 22 includes a housing 42 a first gauge face 46 and a first pointer 50. In this example, the first gauge 22 is a speedometer and the first pointer 50 points to numerals on the gauge face 46 indicative of vehicle speed.

The image of the second gauge 24 includes a second housing 44, second gauge face 48 and second pointer 52. The image of the second gauge 24 is that of a tachometer where the pointer 52 indicates current engine rpm.

The image of the example housings 42, 44 can be complemented with a bezel ring with a highlight color or of chrome to provide an image of a reflective surface.

The image of the object 26 is a depiction of a vehicle moving along a roadway. As appreciated, the object 26 may include other images such as graphs and numerical displays communicating information to the operator 34.

Figure 4:
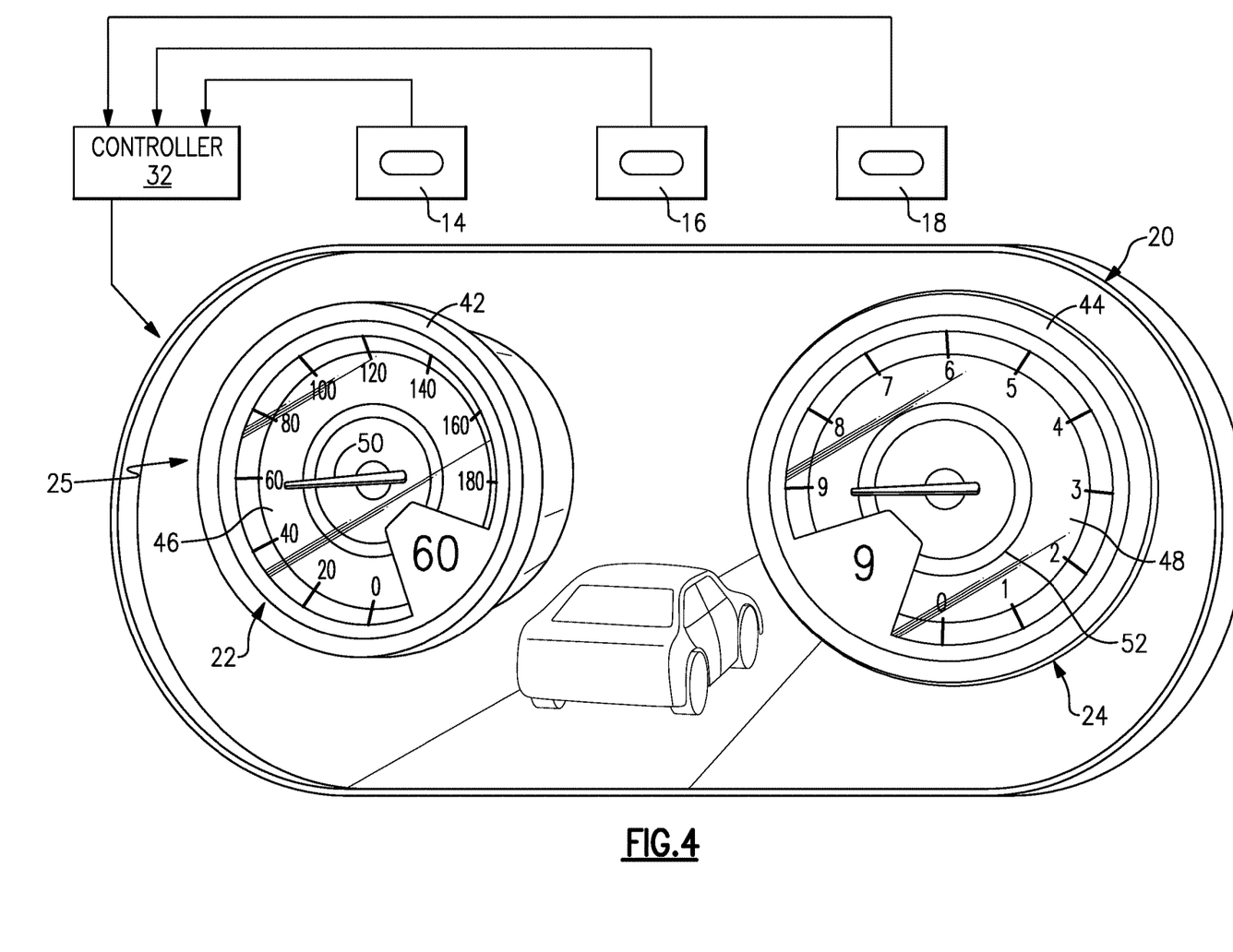
FIG. 4 is a schematic view of the example modified image generated by the display from a first side perspective view.

Referring to FIG. 4, the image 25 generated on the display 20 is shown as would be viewed from a right side of the gauges 22, 24. In this view, a perspective if utilized to show an angled view of each housing 42, 44 as would be viewed if actual gauges where present. The object 26 is also viewed from the perspective of someone viewing from the right side. In this disclosed example, the view is portrayed as would be observed by an operator looking from approximately 30° from one side. The perspective angle is determined by the sensors 14, 16 that measure the actual position of the operator 34 relative to the display 20. In another disclosed example embodiment, the modified image includes a perspective view emulating a perspective view between 1° and 45° left, right, above or in any direction relative to the display. Additionally, in a further disclosed example embodiment, the image 25 represents a continually moving image that emulates a perspective within a combined horizontal and vertical planes.

As appreciated, if the image 25 is not adjusted, only a two-dimensional image will be visible that does not provide the perspective view generated on the display. However, the example display 20 is modified responsive to instructions provided by the controller 32.

The controller 32 is a device and/or system for performing necessary computing or calculation operations needed to modify the image 25. The example controller 32 may be specially constructed for this purpose, or it may comprise at least a general-purpose vehicle controller selectively activated and/or configured by a program stored therein. The controller 32 includes an algorithm that modifies the image 25 to provide the desired perspective view based on the information provided by the sensors 14, 16 and 18.

Figure 5:
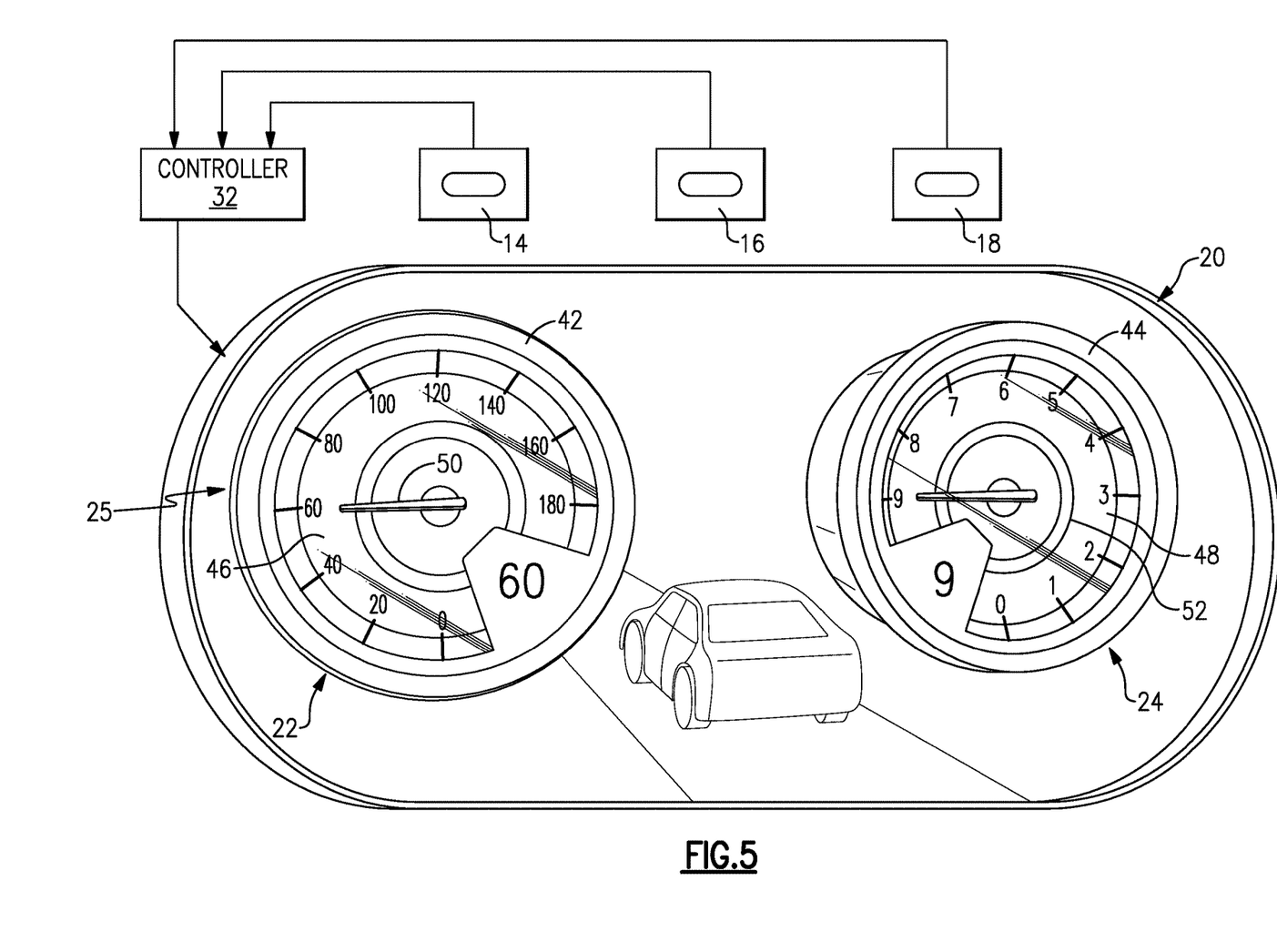
FIG. 5 is a schematic view of the example modified image generated by the display from a second side perspective view.

Referring to FIG. 5, the image 25 generated on the display is shown as would be viewed from a left side of the gauges 22, 24. In this view, the perspective is changed to emulate how the operator would view the image from the left side. In this example, the sensors 14, 16 detect that the operator 34 is looking at the display 20 and image 25 from an angle approximately 30 left of center as shown in FIG. 3. The view is modified utilizing known illustration perspective techniques.

It should be appreciated, that the changes to the image 25 are dynamic and continually change based on movement of the operator's head 38 and eyes 36. Moreover, the image is not simply modified based on left and right relative orientations, but are also modified based on the height of the operator 34. The image 25 is modified based on the operator's stature relative to the display 20. For example, the image 25 will be altered in one way for one operator and another way for a different operator based on the position of each individual operators head 38 and eye 36.

Furthermore, modifications to the image 25 are made based on orientations in both the horizontal plane indicated by the different left and right perspective views and the vertical plane indicated by the up and down angles relative the image 25 and the display. Moreover, it should be appreciated that many combinations of image 25 combining both changes in relative orientations in the horizontal and vertical plans are utilized to modify the image 25.

Figure 6:
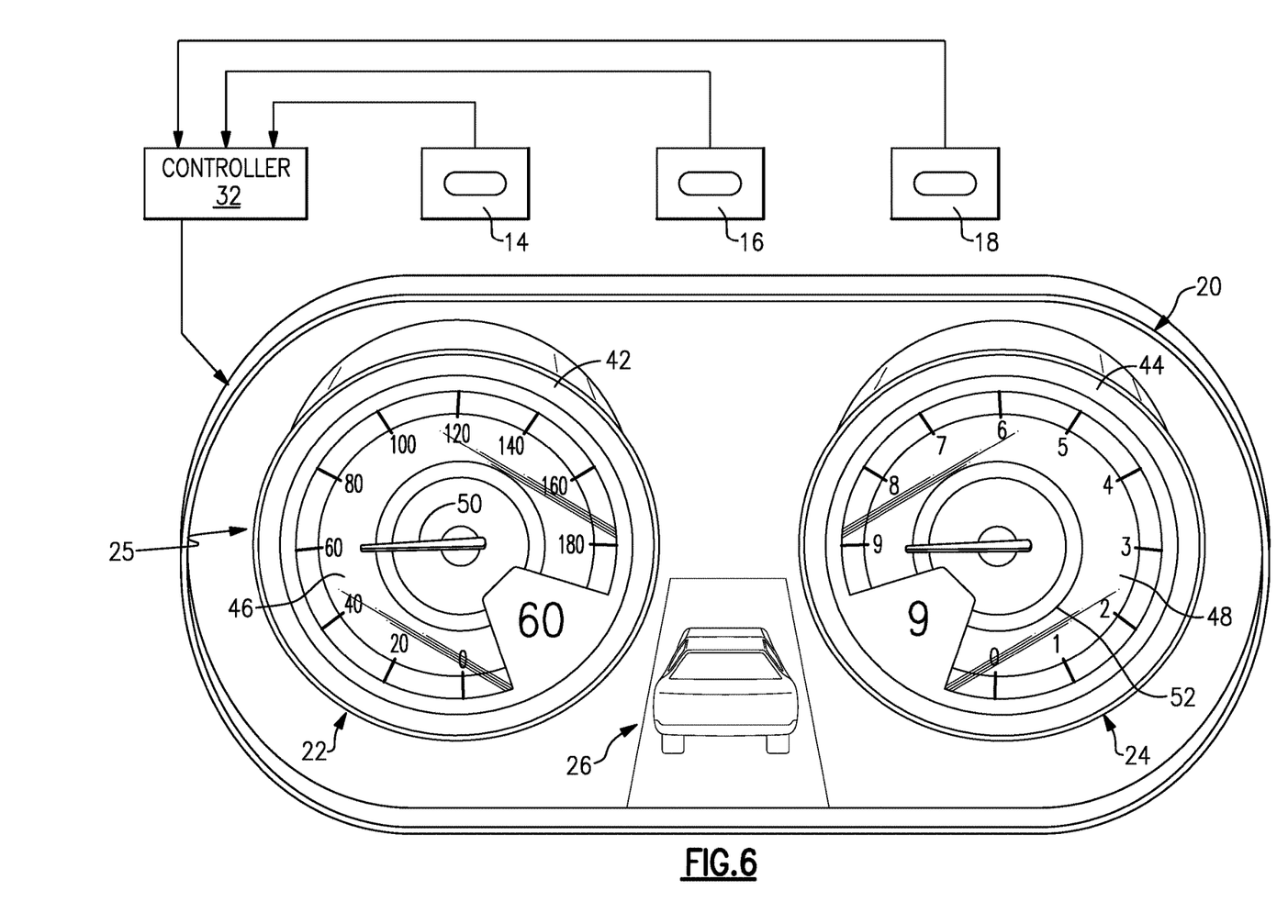
FIG. 6 is a schematic view of the example modified image generated by the display from a first top perspective view.

Referring to FIG. 6, image 25 is shown based on a position of the operator 34 above and to the right side of the display 20. In this relative orientation, parts of the top of each gauge 22, 24 are visible as well as a top of the object 26. As appreciated, the views shown in FIGS. 4-6 are provided by way of example and that the possible variations made to the image 25 based on the relative view of the operator are limited only by the space available within the vehicle cabin and range of the sensors 14, 16.

Figure 7:
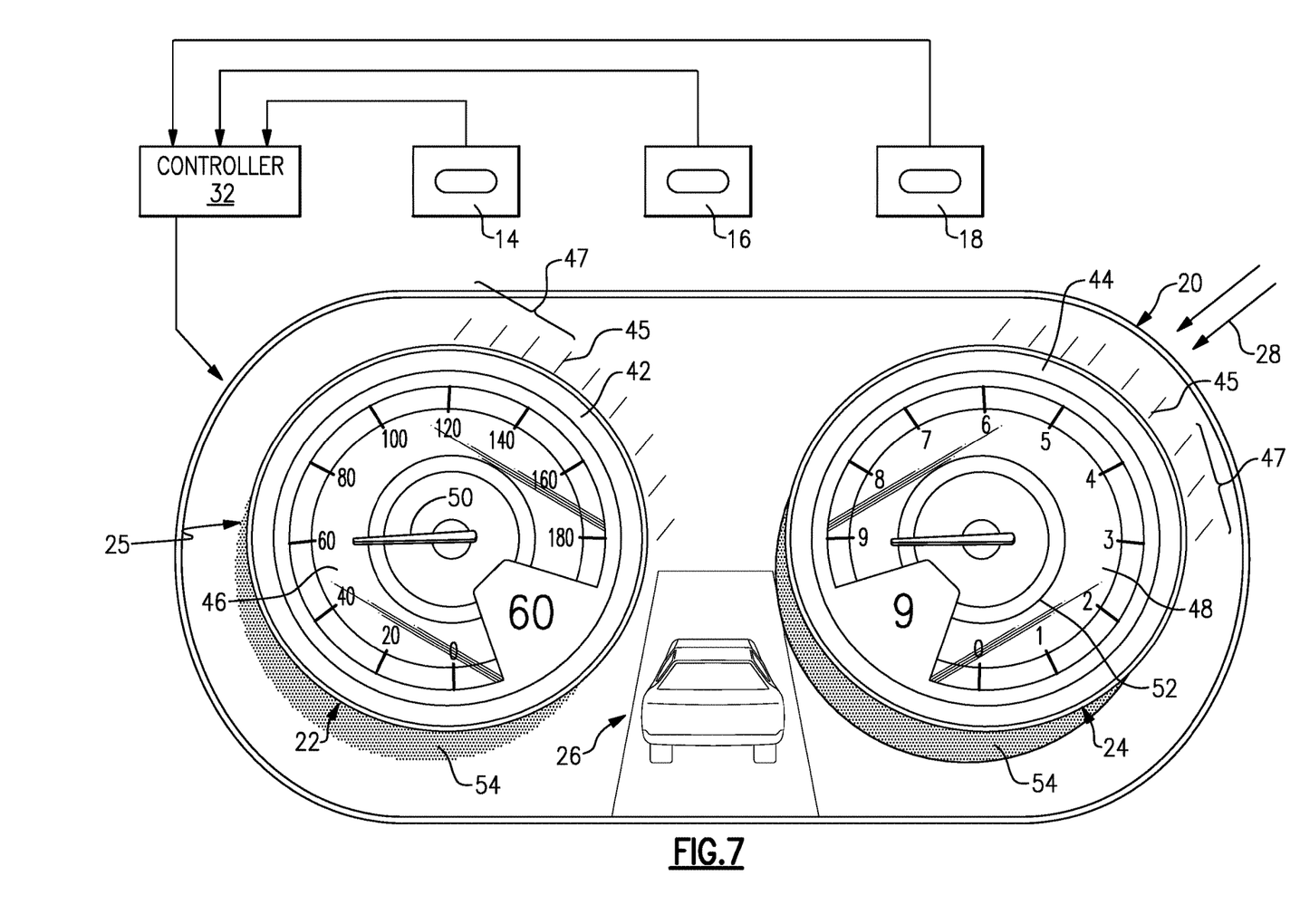
FIG. 7 is a schematic view of the modified image according to the first perspective view and including a first shading modification.

Referring to FIG. 7, the light sensor 18 generates signals based on the intensity and direction of light schematically shown at 28. The controller 32 utilizes the information on light intensity and direction to modify the image 25 to include shadows 54 and shading 56 as would be present if the gauges 22, 24 where 3-dimensional physical objects. Additionally, images of reflective surfaces 45 complete with reflections, schematically shown at 47, corresponding with the direction of light can be included and are within the contemplation of this disclosure. The addition of shadows, shading and reflections provides an additional level of realism. The direction and amount of shading 56 and shadow 54 are determined based on the direction of the light 28 and also provided to provide a desired aesthetic appearance of the gauges 22, 24.

Accordingly, the example display 20 generates a continually changing image 25 based on a position of the operator and conditions surrounding the instrument panel assembly 12.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A vehicle instrument panel assembly comprising:
   a display that generates an image indicative of a vehicle operating parameter, wherein the image comprises a first gauge including a first housing and a first gauge face, a second gauge including a second housing and a second gauge face and an object disposed between the first gauge and the second gauge, wherein the object includes at least one of a symbol, graph, chart and/or a text box indicative of a current status of a vehicle system;
   a first sensor disposed proximate the display that senses a position of an operator relative to the display;
   a controller that modifies the image responsive to the sensed position of the operator;
   a second sensor disposed proximate the display that sense a position of an operator's eyes relative to the display;
   wherein the controller modifies a perspective of the image based on the sensed position of the operator's eyes relative to the display; and
   wherein the modified image comprises a perspective view emulating moving between 1° and 45° in any direction relative to the display of at least one representation of a gauge with a pointer that indicates a value of a current operating parameter, wherein the gauge comprises an outer housing and a gauge face on which the pointer indicates and the perspective view emulates a view of the gauge as would be viewed if present in the instrument panel assembly in-place of the display.

2. The vehicle instrument panel assembly as recited in claim 1, wherein the image further includes a graphical representation of an object disposed on the display and the perspective view emulates a view of the object as would be viewed if present in the instrument panel assembly in-place of the display.

3. The vehicle instrument panel assembly as recited in claim 1, including a light sensor that detects a light level surrounding the display and wherein the controller modifies the image responsive to the light level surrounding the display.

4. The vehicle instrument panel assembly as recited in claim 3, wherein modification of the image comprises generation of a shadow or a reflection based on a direction of light sensed by the light sensor.

5. A method of communicating information to an operator of a motor vehicle comprising:
   generating an image representing a gauge on a display screen disposed within a vehicle instrument panel assembly;
   sensing a position of an operator relative to the image generated on the display with a first sensor disposed proximate the vehicle instrument panel assembly;
   modifying the image automatically with a controller to be a perspective view of the gauge as would be viewed by the operator based on the sensed position of the operator eyes relative to the image generated on the display, wherein the modified image comprises a perspective view emulating moving between 1° and 45° in all directions relative to the display; and
   generating a graphical representation of an object on the display wherein the perspective view emulates a view of the object as would be viewed if present in the instrument panel assembly in-place of the display.

6. The method as recited in claim 5, including sensing a position of an operators eyes relative to the image generated on the display with a second sensor disposed proximate the display.

7. The method as recited in claim 5, including detecting a light level and direction of light surrounding the display with a light sensor and modifying the image to include shadows responsive to the sensed light level and direction of light.

8. The method as recited in claim 5, wherein the image of a gauge comprises a first gauge including a first housing and a first gauge face, a second gauge including a second housing and a second gauge face.

\* \* \* \* \*